United States Patent [19]
Grawey et al.

[11] 3,998,258
[45] Dec. 21, 1976

[54] EXPANDABLE TIRE RIM ARRANGEMENT AND METHOD OF INSTALLATION

[75] Inventors: Charles E. Grawey; John J. Groezinger, both of Peoria, Ill.

[73] Assignee: Caterpillar Tractor Co., Peoria, Ill.

[22] Filed: Apr. 28, 1975

[21] Appl. No.: 572,365

[52] U.S. Cl. .............................. 152/405; 152/379 R; 301/16; 301/100
[51] Int. Cl.² ................... B60C 5/00; B60B 23/02; B60B 25/02
[58] Field of Search .......... 152/396, 405, 401, 402, 152/406, 407, 328, 354, 379 R; 301/35 R, 35 SS, 11 CD, 11 S, 16, 100, 99

[56] References Cited
UNITED STATES PATENTS

| 892,640 | 7/1908 | Ament | 301/100 |
|---|---|---|---|
| 1,496,920 | 6/1924 | Bradt | 301/16 |
| 1,582,575 | 4/1926 | Casteran | 152/328 |
| 1,869,634 | 8/1932 | Walther | 301/100 |
| 3,606,921 | 9/1971 | Grawey | 152/354 |

*Primary Examiner*—Drayton E. Hoffman
*Attorney, Agent, or Firm*—Charles E. Lanchantin, Jr.

[57] ABSTRACT

An expandable tire rim arrangement is disclosed including a transversely split tire supporting rim having an outer peripheral tire engaging surface, an inner peripheral surface, and relatively circumferentially movable ends disposable between a rim diameter reducing position for ease of insertion of the supporting rim axially into a tire and a rim diameter increasing position, and a rim expanding and wheel mounting assembly having diametric dimensions somewhat larger than the diameter of the inner peripheral surface of the supporting rim when in its diameter reducing position and being axially slidably insertable into the supporting rim for tightly expanding it against the tire.

19 Claims, 12 Drawing Figures

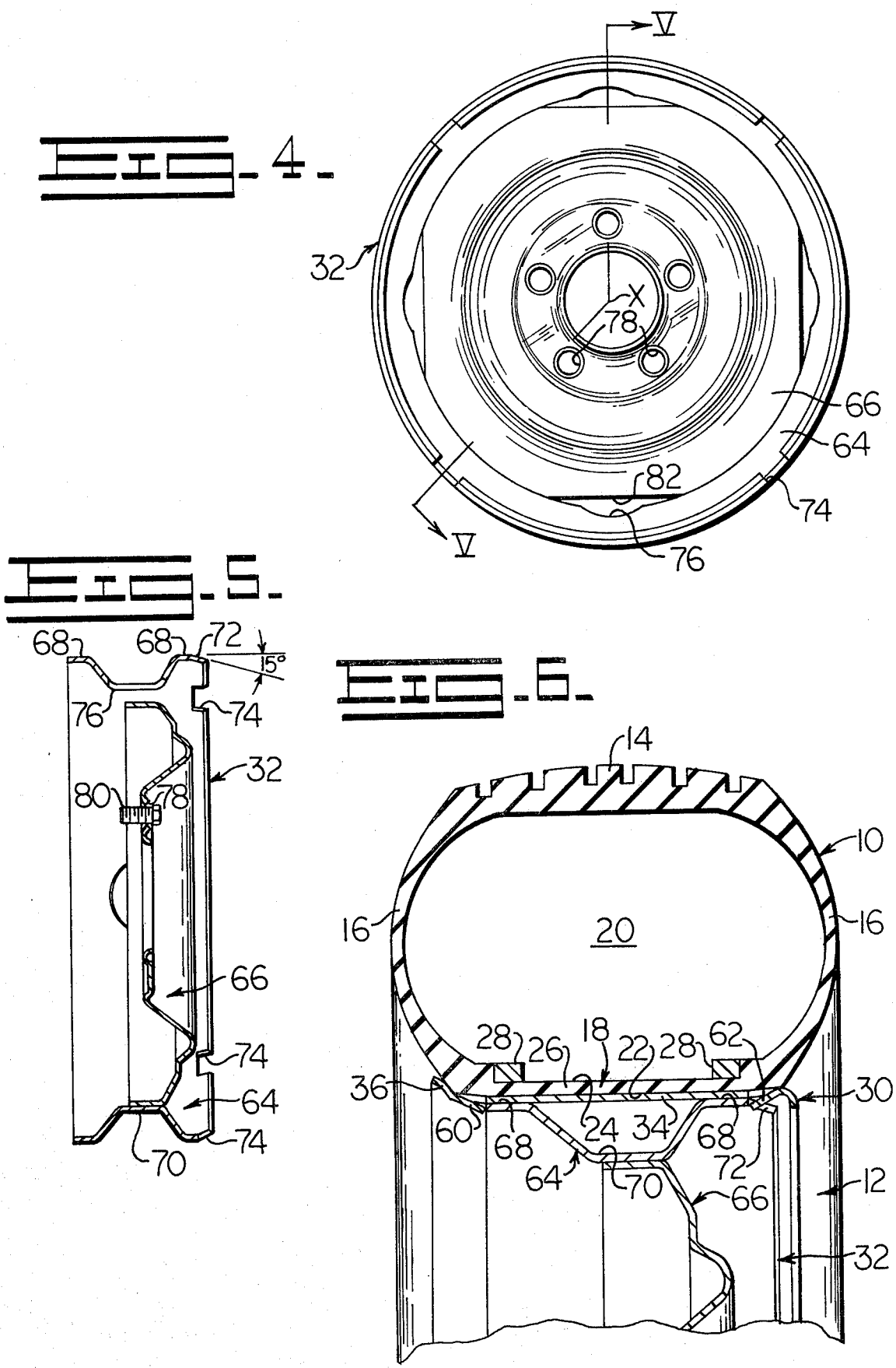

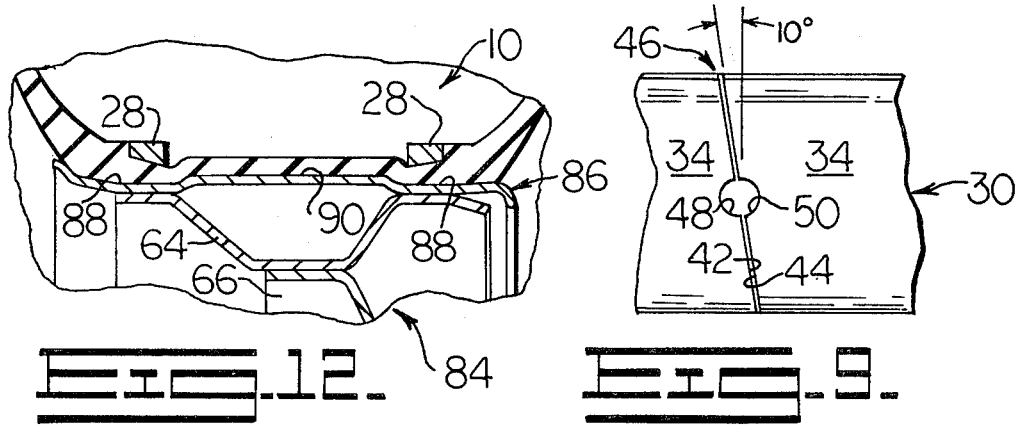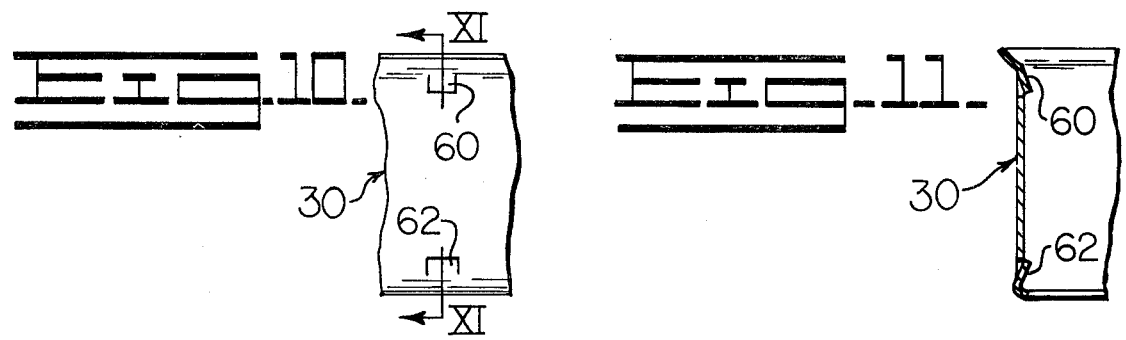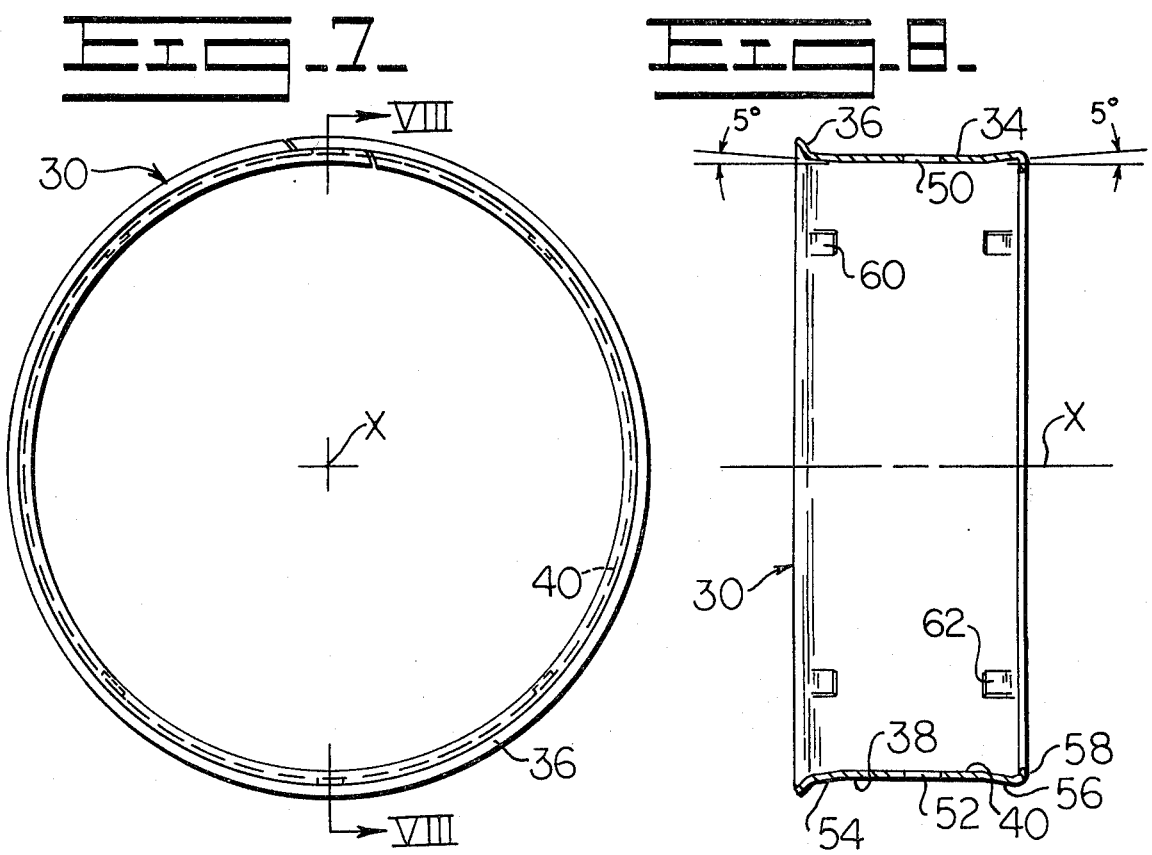

EXPANDABLE TIRE RIM ARRANGEMENT AND METHOD OF INSTALLATION

BACKGROUND OF THE INVENTION

Hollow toroidal or oval pneumatic tires of the type disclosed in U.S. Pat. No. 3,606,921, issued Sept. 21, 1971 to C. E. Grawey and assigned to the assignee of the present invention represent a considerable advancement in the art. However, these tires have a substantially nonexpandable inner peripheral mounting surface because of their construction which usually includes a pair of transversely spaced restraining hoops near the radially inner base of the sidewalls. Accordingly, the rim mounting arrangement for such tires has been heretofore a rim structure with axially interlocking flange halves for grippingly holding the tire thereon. Each of the flange halves includes an outwardly flared or conical peripheral surface, so that as they are axially moved together they entrap the tire within the peripheral concavity formed by the opposing flared surfaces. The difficulty with this is that there is an initial gap between the flange halves in which the tire can be pinched, and further the tire has a tendency to axially slip a disproportionate amount on each flared surface so that during installation of the flanges the tire tends to buckle or become offcentered. As a result, the fastening devices which are utilized to secure the flange halves together must be sequentially limitedly tightened with considerable care to minimize these difficulties. Another problem is that the rim structures must be heavy and rugged in construction in order to withstand the relatively high assembly loads at an increase in cost and at a reduction in serviceability thereof.

Further exemplifying the state of the art are U.S. Pat. Nos. 991,045 issued May 22, 1911 to J. H. Andrews et al; U.S. Pat. No. 1,160,222 issued Nov. 16, 1915 to J. H. Wagenhorst; U.S. Pat. No. 1,582,575 issued Apr. 27, 1926 to J. G. Casteran; and U.S. Pat. No. 3,291,171 issued Dec. 13, 1966 to W. E. F. Lehmann. However, as far as is known none of these references have tire rim mounting arrangements which exhibit the degree of expandable tire gripping fit required along with a simple, lightweight, and economical structure. In addition, the methods of installing the rim mounting arrangements within the tires are relatively complex.

SUMMARY AND OBJECTS OF THE INVENTION

Accordingly, an object of this invention is to overcome the above briefly described problems by providing an expandable tire rim arrangement which will positively grip the inner peripheral mounting surface of a oval pneumatic tire and yet be of relatively simple construction.

Another object of the present invention is to provide such an improved expandable tire rim arrangement which is lightweight, but rugged in its construction.

Another object is to provide an improved expandable tire rim arrangement of the character described which can be conveniently inserted collapsibly within the tire, can be easily expanded grippingly within it, and can be secured both axially and circumferentially with a minimum of service effort.

Other objects and advantages of the present invention will become more readily apparent upon reference to the accompanying drawings and the following description.

BRIEF DESCRIPTION OF THE DRAWINGS

FIG. 4 is an elevational side view of a rim expanding and wheel mounting assembly forming a major portion of the expandable tire rim arrangement of the present invention.

FIG. 5 is a sectional view of the rim expanding and wheel mounting assembly of FIG. 4 taken along the line V—V thereof.

FIG. 6 is an enlarged fragmentary cross sectional view of the tire and expandable tire rim arrangement generally shown in FIG. 1 as taken along a plane passing through the central axis thereof.

FIG. 7 is an elevational side view of a split tire supporting rim also forming a major portion of the expandable tire rim arrangement of the present invention.

FIG. 8 is a diametral sectional view of the split tire supporting rim of the present invention as taken along the line VIII—VIII of FIG. 7.

FIG. 9 is a fragmentary plan view of the transversely inclined joint portion of the split tire supporting rim of FIGS. 7 and 8.

FIG. 10 is another fragmentary plan view of the split tire supporting rim shown in FIGS. 7 and 8 showing more clearly a pair of deformable tabs provided therein in accordance with one of the features of the present invention.

FIG. 11 is a fragmentary cross sectional view of the split tire supporting rim of the present invention taken along the line XI—XI of FIG. 10.

FIG. 12 is an enlarged fragmentary cross sectional view of an alternate embodiment expandable tire rim arrangement of the present invention, somewhat comparable to FIG. 6.

DESCRIPTION OF THE PREFERRED EMBODIMENT

Figure 1:
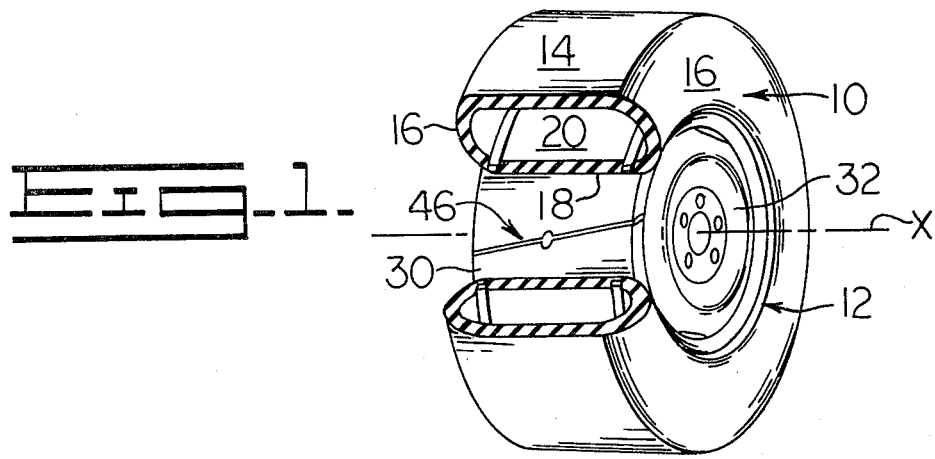
FIG. 1 is a perspective elevational view of an oval pneumatic tire mounted on the expandable tire rim arrangement of the present invention with a portion of the tire broken away to better illustrate details thereof.

Referring initially to FIGS. 1 and 6, a hollow toroidal or oval pnneumatic tire 10 is shown as being disposed on an expandable tire rim arrangement 12 in accordance with the present invention. In general, the tire has an axially elongated, outer peripheral tread portion 14, a foreshortened facing pair of arcuately shaped sidewalls 16, and a radially inner peripheral base identified generally by the reference numeral 18 to define a internal air changer 20 within it. The tires base is provided with a valve stem arrangement therethrough, not shown, to enable compressed air to be delivered radially outwardly to the air chamber in the usual manner.

As best shown in FIG. 6, the base 18 of the tire 10 has a radially inner rim mounting surface 22 thereon and a radially outer chamber facing surface 24 which provides a relatively thin tubular section 26 centrally thereof. Adjacent the intersection of this tubular section and each of the sidewalls the tire section is somewhat thicker and internally profiled in a predetermined manner to receive a pair of transversely spaced and radially inwardly disposed annular restraining devices or roll restraining hoops 28. Such a tire is formed of a suitable elastomeric material with relatively inextensible, wire reinforcing, not shown, wound through it so that the rim mounting surface 22 is substantially nonexpandable. While this tire construction is described in greater detail in the aforementioned U.S. Pat. No. 3,606,921, it should be noted that the internal diameter of the rim mounting surface is nevertheless relatively limitedly radially expandable by the installation of the tire rim arrangement 12 of the present invention, for example, in the order of up to 3% greater than its diameter in the free state in order to assure sufficient frictional mating contact therebetween.

More specifically, the expandable tire rim arrangement 12 of the present invention includes a transversely split tire supporting rim 30 on which the tire 10 is mounted, and a radially inwardly disposed rim expanding and wheel mounting assembly 32,. As best shown in FIG. 8, the supporting rim includes a substantially cylindrical central body portion 34 with a single radially outwardly extending integral flange 36 disposed at the axial inboard side thereof, or to the left when viewing the drawing. The annularly shaped rim is relatively thin, being preferably made from steel sheeting in the order of 2.5 mm (0.1 inch) thick, and has an outer peripheral tire engaging surface 38, an inner peripheral surface 40, and a juxtaposed pair of obliquely formed ends 42 and 44 providing a transversely inclined split joint 46 therebetween as most clearly illustrated in FIG. 9. The ends of the rim are biasably formed at an angle of 10° to a plane passing through the central axis X of the tire in order to assure that any radially wound wire reinforcing in the tire will be adequately supported by not being aligned with the joint. A pair of opposing semicircular notches 48 and 50 open outwardly on the ends of the rim to permit access to a tire plug or the like, not shown, and an opposite hole 52 is provided therein as shown in FIG. 8 to similarly permit access to a valve stem, also not shown.

While the split tire supporting rim 30 is substantially cylindrical as hereinbefore described, it preferably also has a slightly diverging conical portion 54 which extends axially to blend with the inboard flange 36, and a laterally opposite and similarly diverging conical portion 56 which blends with a radially inwardly rolled outboard lip 58. As is illustrated in FIGS. 6 and 8 these laterally spaced conical portions are inclined at approximately 5° with respect to the tire axis X to slightly entrap the tire 10 thereon axially outwardly of both of the roll restraining hoops 28. Further, as shown in FIGS. 10 and 11, the supporting rim has a plurality of deformable tabs 60 and a plurality of deformable tabs 62 formed in the inboard and outboard conical portions, respectively, for axially extending interlocking engagement with the rim expanding and wheel mounting assembly 32 as will be subsequently described.

Referring now to FIGS. 4, 5 and 6, the rim expanding and wheel mounting assembly 32 generally consists of an outer rim engaging member 64 and an inner wheel mounting flange 66 integrally secured thereto as by welding or the like. More specifically, the relatively thin, steel rim engaging member has a laterally spaced pair of cylindrical mounting surfaces 68 and a concave central portion 70 therebetween providing additional strength thereto. It also has a conical leading edge 72 disposed at a 15° angle of convergence with respect to the tire axis X at the outboard side thereof in which are formed a plurality of tab receiving, axially endwardly opening slots or notches 74. In addition, the rim engaging member has four valve stem access and weight reducing openings 76 symmetrically formed therethrough for balance purposes. On the other hand, the wheel mounting flange 66 is contoured for maximum strength and is provided with a plurality of bolt holes 78 therethrough for receipt of the usual retaining bolts 80 as is shown schematically in FIG. 5. The mounting flange also has four flat outer edge surfaces 82 thereon, as best illustrated in FIG. 4, which are beneficially aligned with the valve stem access openings in the rim engaging member.

Figure 2:
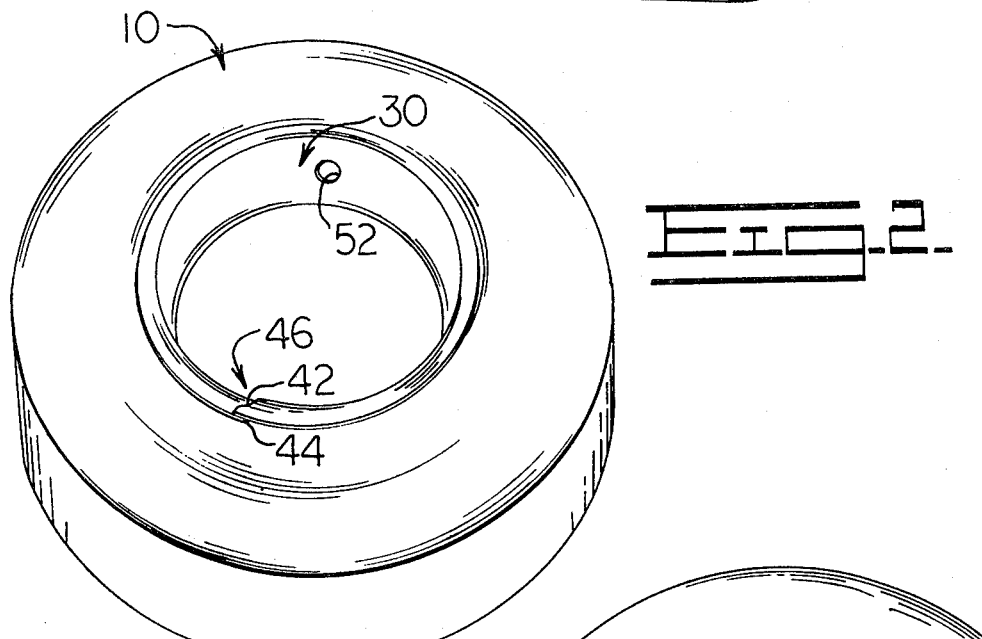
FIG. 2 is a perspective view of an oval pneumatic tire with a split tire supporting rim disposed therein in a rim diameter reducing position in accordance with an early assembly stage of the expandable tire rim arrangement of the present invention.

Thus, upon inspection of FIG. 6, it is apparent that the oval pneumatic tire 10 is centrally mounted in place on the split tire supporting rim 30 with the tire in abutting relation with the flange 36. In this condition the rim expanding and wheel mounting assembly 32 presses radially outwardly against the supporting rim and separates the relatively circumferentially movable ends 42 and 44 thereof to place it in a rim diameter increasing position. This assures positive frictional engagement thereof against the rim mounting surface 22 of the tire. Further, the deformable tabs 60 and 62 serve to axially lock the supporting rim on the wheel mounting assembly, and the outboard tabs 62 are positioned within the notches 74 of the rim engaging member 64 to also prevent relative circumferential movement therebetween Operation While the operation of the present invention is believed clearly apparent from the foregoing description, further amplificaton will subsequently be made in the following brief summary of such operation. As best shown in FIG. 2, the initial assembly procedure is to place the split tire supporting rim 30 when in its rim diameter reducing position freely within the depressurized tire 10 until the flange 36, acting as a stop, abuts the sidewall 16. In this condition the relatively circumferentially movable ends 42 and 44 of the rim overlap as is clearly illustrated to enable the rim to be conveniently axially inserted in the tire, and with the valve stem access hole 52 therein properly radially aligned with the tire. Beneficially, the valve stem access hole is disposed diametrically opposite the split joint 46 to minimize circumferential movement thereof when the rim is subsequently expanded.

Figure 3:
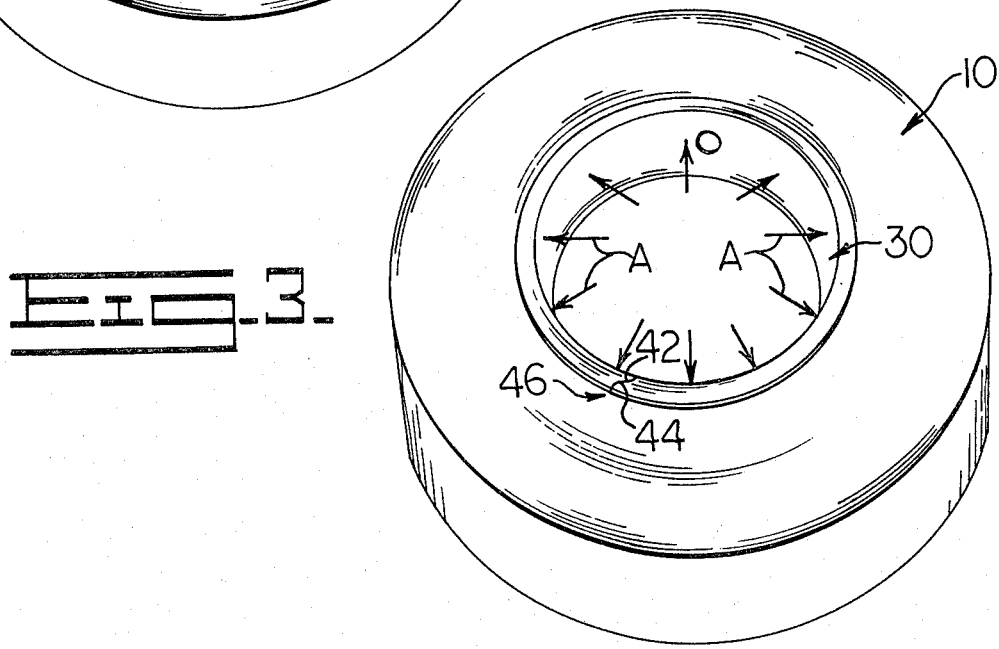
FIG. 3 is a perspective view of the tire and the supporting rim similar to FIG. 2, only showing the supporting rim in a intermediate rim diameter position in accordance with a subsequent assembly stage of the present invention.

Next, as is schematically illustrated in FIG. 3, the supporting rim 30 is expanded by any suitable apparatus, not shown, as is generally indicated by the plurality of circumferentially spaced, radially outwardly directed force indicating arrows A. This expansion of the rim continues within the tire 10 until the ends 42 and 44 are disposed in an abutting condition. At this stage the expanding apparatuus is removed therefrom and the rim is sufficiently strong enough to maintain itself in an intermediate rim diameter position, which is substantially equivalent to a size-to-size fit within the inner peripheral rim mounting surface 22 of the tire.

As may be visualized best with reference to FIG. 6, the rim expanding and wheel mounting assembly 32 is subsequently positioned axially inboard and in radial alignment with the tire 10 and the rim 30 in its intermediate rim diameter position. This is achieved by visually aligning the notches 74 within the outer rim engaging member 64 with the inboard tabs 60 of the rim. With the conical leading edge 72 of the rim engaging member self-centeringly disposed within the slightly diverging conical portion 54 of the rim, the rim expanding and wheel mounting assembly is axially pressed into place. This expands the rim from its intermediate rim diameter position to a rim diameter increasing position, wherein the ends 42 and 44 of the rim are disposed in limitedly circumferentially spaced apart relation.

In this way, in accordance with one of the features of the present invention, the central body portion 34 of the supporting rim 30 serves to establish an interference fit with the internal rim mounting surface 22 of the tire 10 of approximately 0.3% to 2.0% of the free internal diameter thereof. Preferably, such interference fit is established within the range of from 0.5% to 1.5%. Of course, it will be appreciated that the rim could deform if the interference fit is excessive, or alternately, the tire could be damaged if the rim is stronger than the roll restraining hoops 28.

In accordance with one aspect of the invention, the outboard deformable tabs 62 may serve as stop members for limiting the axial outward movement of the wheel mounting assembly 32 during the assembly thereof. To assure that they are properly positioned, however, a screwdriver blade or the like may be inserted under the rim mounting surface 22 of the tire to depress the tabs 60 and 62 radially inwardly. This positively interlocks the rim and the wheel mounting assembly, and prevents both relative axial and circumferential movement therebetween. Subsequently any remaining portion of the valve stem arrangement, not shown, is screw threadably secured in place to allow pressurized air to be communicated with the tire's air chamber 20.

To remove the tire from the expandable tire rim arrangement of the present invention, the aforementioned process is merely reversed. With the inboard tabs 60 suitably deformed by a service tool into a substantially flush condition within the split tire supporting rim 30, the wheel mounting assembly 32 is axially pressed toward the inboard side and outwardly away from the rim and the depressurized tire.

Description of Alternate Embodiment

As illustrated in FIG. 12 an alternate embodiment expandable tire rim arrangement 84 includes a raised center split tire supporting rim 86. The tire and all other members of the expandable tire rim arrangement are substantially similar to those described above with respect to the preferred embodiment and, accordingly, the same reference numerals apply.

More particularly, however, the raised center supporting rim 86 includes a laterally spaced pair of substantially cylindrical tire mounting surfaces 88 substantially radially aligned with the roll restraining hoops 28, and a raised center section 90 disposed therebetween. Like the preferred embodiment, the cylindrical tire mounting surfaces serve to limitedly compress the section of tire radially inwardly of the roll restraining hoops to hold the tire on the rim. On the other hand, the raised center section of the preferred embodiment allows additional radial compression centrally of the tire to more securely hold the tire against lateral forces acting thereon. In addition, the raised center section would eliminate any tendency of the hoops to move together, substantially contributing to the stability of the interlocking members.

Thus, it is apparent that the expandable tire rim arrangement of the present invention teaches use of a relatively simple split tire supporting rim with a single flange 36 thereon to assure proper alignment of the rim and the tire. It also teaches use of a lightweight rim with relatively circumferentially movable inclined ends 42 and 44 selectively disposable in a rim diameter reducing position, an intermediate rim diameter position where the ends are disposed in abutting engagement, and a fully installed rim diameter increasing position to assure positive frictional, limitedly interfering engagement with the tire. Further, it shows a rim expanding and wheel mounting assembly 32 adapted for self-centering insertion within the rim when in its intermediate position for tightly expanding it against the tire, and inboard and outboard interlocking tabs to properly locate and hold these members against relative movement. Still further, this economical, but relatively strong arrangement is easy to assemble and disassemble.

While the invention has been described and shown with particular reference to a preferred and an alternate embodiment, it will be apparent that variations might be possible that would fall within the scope of the present invention, which is not intended to be limited except as defined in the following claims.

What is claimed is:
1. An expandable tire rim arrangement comprising;
   a transversely split tire supporting rim having an outer peripheral tire engaging surface, an inner peripheral surface, and circumferentially relatively movable ends disposable between a reduced diameter position for ease of insertion of said supporting rim axially into a tire and an increased diameter position; and
   a rim expanding and wheel mounting assembly including a cylindrical surface portion somewhat larger than the diameter of said inner peripheral surface of said supporting rim when in its reduced diameter position and including tapered surface means on at least one of said supporting rim and said wheel mounting assembly for guidably assuring slidable insertion of said wheel mounting assembly in one axial direction into said supporting rim for expanding it to its increased diameter position and tightly against the tire.

2. The expandable tire rim arrangement of claim 1 wherein said ends of said supporting rim overlap in said rim reduced diameter position and are limitedly peripherally spaced apart in said increased diameter position.

3. The expandable tire rim arrangement of claim 2 wherein said supporting rim includes a radially outwardly extending flange which serves as a stop for abutting engagement with the tire for assuring proper axial positioning therebetween.

4. The expandable tire rim arrangement of claim 3 including interlocking deformable tab means said supporting rim and said rim expanding and wheel mounting assembly for maintaining a predetermined axial and circumferential relationship therebetween.

5. The expandable tire rim arrangement of claim 3 wherein said supporting rim includes a plurality of deformable tabs therein providing a plurality of axial stops for axially centering it on said rim expanding and wheel mounting assembly.

6. The expandable tire rim arrangement of claim 5 wherein said rim expanding and wheel mounting assembly includes an outer rim engaging member with a plurality of peripherally spaced notches formed therein and wherein at least some of said deformable tabs in said supporting rim are individually received in said notches for preventing relative circumferential movement therebetween.

7. The expandable tire rim arrangement of claim 3 wherein said rim expanding and wheel mounting assembly includes an outer rim engaging member and said tapered surface means includes a conical leading edge on said member for more easily initiating sliding insertion thereof within said supporting rim.

8. The expandable tire rim arrangement of claim 7 wherein said inner peripheral surface of said supporting rim and said tapered surface means includes a conical surface portion which axially cooperates with said conical leading edge of said outer rim engaging member for improved centering and initial sliding insertion thereof axially within it.

9. An expandable tire rim arrangement for use with an oval pneumatic tire having a pair of transversely spaced and radially inwardly disposed annular restraining devices therein and thereby providing a substantially nonexpandable inner peripheral mounting surface thereon, comprising;
- a transversely split tire supporting rim having a outer peripheral tire engaging surface, an inner peripheral surface, and circumferentially relatively movable ends disposable between a reduced diameter position for ease of insertion of said supporting rim axially into such tire and an increased diameter position; and
- a rim expanding and wheel mounting assembly including a cylindrical surface portion larger than the diameter of said inner peripheral surface of said supporting rim when in its reduced diameter position and being slidably insertable into said supporting rim in one axial direction for tightly expanding it to its increased diameter position against said tire and with an interference fit of up to 2% of the diameter of the mounting surface of the tire to assure positive frictional engagement therewith.

10. The expandable tire rim arrangement of claim 9 wherein said ends of said supporting rim overlap in said reduced diameter position and are limitedly peripherally spaced apart in said increased diameter position.

11. The expandable tire rim arrangement of claim 10 wherein said supporting rim includes a radially outwardly extending flange which serves as a stop for abutting engagement with the tire for assuring proper axial positioning therebetween.

12. The expandable tire rim arrangement of claim 11 including interlocking deformable tab means between said supporting rim and said rim expanding and wheel mounting assembly for maintaining a predetermined axial and circumferential relationship therebetween.

13. The expandable tire rim arrangement of claim 12 wherein said rim expanding and wheel mounting assembly includes a rim engaging member with a pair of laterally spaced apart mounting surfaces thereon which are radially alignable with such pair of annular restraining devices in said tire to better transmit compressive loads thereto.

14. The expandable tire rim arrangement of claim 13 wherein said supporting rim includes a raised center section for improved interlocking juxtaposed engagement between said annular restraining devices.

15. A method of mounting an oval pneumatic tire on an expandable tire rim arrangement comprising;
- inserting a transversely split tire supporting rim freely axially within the tire with the opposite ends thereof in an overlapping reduced diameter condition;
- expanding said supporting rim within the tire until said ends abut; and
- inserting a wheel mounting assembly having a cylindrical surface portion guidably axially within said supporting rim in one axial direction to further expand said supporting rim tightly against the tire and with said ends disposed in peripherally spaced apart relation.

16. The method of claim 15 including the step of locking said supporting rim to said wheel mounting assembly to thereby prevent both axial and circumferential relative movement therebetween.

17. An expandable tire rim arrangement comprising;
- an oval pneumatic tire having an inner peripheral base with a central tubular section and a radially inwardly disposed roll restraining hoop on each side thereof;
- a transversely split tire supporting rim outwardly peripherally engaged with said tire and having a central body portion radially aligned with said central tubular section and said roll restraining hoops of said tire; and
- a wheel mounting assembly disposed radially within said supporting rim and having diametral dimensions sufficient to expand and maintain said supporting rim in an interference fit with said tire including a laterally spaced pair of cylindrical mounting surfaces which are radially aligned with said roll restraining hoops to better transfer loads therebetween.

18. The expandable tire rim arrangement of claim 17 wherein said supporting rim includes a raised center section for improved interlocking engagement against said central tubular section of said tire and between said roll restraining hoops.

19. An expandable tire rim arrangement comprising;
- a tire having an inner peripheral base portion;
- tire supporting rim means forming a pair of laterally spaced apart outer peripheral tire engaging surfaces, a radially outwardly raised center section therebetween, and a pair of laterally spaced apart inner peripheral surfaces, for mating engagement with said base portion of said tire at a reduced diameter condition; and
- a wheel mounting assembly including cylindrical surface means diametrically larger than said reduced diameter condition for radially outward engagement against said spaced apart inner peripheral surfaces of said rim means for expanding said spaced apart outer peripheral surfaces and said raised center section interlockingly tightly against said tire.

* * * * *